United States Patent
Jing

(10) Patent No.: US 11,748,661 B2
(45) Date of Patent: Sep. 5, 2023

(54) TRAINING METHOD AND APPARATUS FOR A DISTRIBUTED MACHINE LEARNING MODEL AND MEDIUM

(71) Applicant: BEIJING BAIDU NETCOM SCIENCE TECHNOLOGY CO., LTD., Beijing (CN)

(72) Inventor: Bo Jing, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/932,405

(22) Filed: Sep. 15, 2022

(65) Prior Publication Data

US 2023/0078726 A1    Mar. 16, 2023

(30) Foreign Application Priority Data

Sep. 15, 2021    (CN) .......................... 202111079943.4

(51) Int. Cl.
| | | |
|---|---|---|
| *H04L 9/00* | (2022.01) | |
| *G06N 20/00* | (2019.01) | |
| *H04L 9/08* | (2006.01) | |

(52) U.S. Cl.
CPC ............. *G06N 20/00* (2019.01); *H04L 9/008* (2013.01); *H04L 9/088* (2013.01)

(58) Field of Classification Search
CPC .......... G06N 20/00; H04L 9/008; H04L 9/088
See application file for complete search history.

(56) References Cited

U.S. PATENT DOCUMENTS 11,205,137 B2 * 12/2021 Benke ...................... H04L 9/50
2018/0240011 A1 *  8/2018 Tan .......................... G06N 3/045
(Continued)

FOREIGN PATENT DOCUMENTS

| CN | 107135061 A | 9/2017 |
| CN | 109886417 A | 6/2019 |

(Continued)

OTHER PUBLICATIONS

"Decision to Grant a Patent, The State Intellectual Property Office of People's Republic of China, issued to CN Application No. 202111079943.4, 6 pages.".

(Continued)

*Primary Examiner* — Meng Li
(74) *Attorney, Agent, or Firm* — Hunton Andrews Kurth LLP

(57) ABSTRACT

Provided are a training method and apparatus for a distributed machine learning model, a device and a medium. The training method includes: acquiring a first homomorphic encryption intermediate parameter and a second homomorphic encryption intermediate parameter; generating a first interference parameter, and forming a first encryption interference parameter by encrypting the first interference parameter by using a second homomorphic public key of a second participant; performing calculation based on the first homomorphic encryption intermediate parameter, the second homomorphic encryption intermediate parameter, the first encryption interference parameter and the homomorphic calculation function of a first submodel to generate a first encryption key parameter.

17 Claims, 5 Drawing Sheets

(56) References Cited

U.S. PATENT DOCUMENTS

| | | | |
|---|---|---|---|
| 2020/0125739 A1* | 4/2020 | Verma | G06N 5/043 |
| 2020/0242466 A1 | 7/2020 | Mohassel et al. | |
| 2020/0303048 A1* | 9/2020 | Petri | G06F 40/186 |
| 2020/0358599 A1* | 11/2020 | Baracaldo Angel | G06N 20/10 |
| 2021/0150037 A1 | 5/2021 | Radhakrishnan et al. | |
| 2021/0174243 A1* | 6/2021 | Angel | G06F 16/903 |
| 2021/0234668 A1 | 7/2021 | Manamohan et al. | |
| 2021/0398017 A1* | 12/2021 | Garg | G06N 20/00 |
| 2022/0374762 A1* | 11/2022 | Radhakrishnan | G06N 20/00 |
| 2022/0398343 A1* | 12/2022 | Ou | G06F 21/6254 |

FOREIGN PATENT DOCUMENTS

| | | | | |
|---|---|---|---|---|
| CN | 111046433 A * | 4/2020 | | G06F 21/6245 |
| CN | 112149141 A | 12/2020 | | |
| CN | 112149706 A | 12/2020 | | |
| CN | 112257081 A | 1/2021 | | |
| CN | 113033828 A | 6/2021 | | |
| CN | 113037489 A | 6/2021 | | |
| CN | 113614726 A * | 11/2021 | | G06F 21/6254 |
| WO | WO-2020029589 A1 * | 2/2020 | | G06F 21/602 |
| WO | WO-2021223873 A1 * | 11/2021 | | |
| WO | WO-2022042848 A1 * | 3/2022 | | |

OTHER PUBLICATIONS

"First Chinese Office Action, The State Intellectual Property Office of People's Republic of China, issued to CN Application No. 202111079943.4, 20 pages.".

Zhang et al., "DeepPAR and DeepDPA: Privacy-Preserving and Asynchronous Deep Learning for Industrial IoT," IEEE Transactions on Industrial Informatics, DOI 10.1109/TII.2019.2941244, Sep. 13, 2019, pp. 2081-2090.

Weichao HE, "Research on Key Technologies of privacy-preserving Machine Learning Based on Homomorphic Encryption," University of Electronic Science and Technology of China, Jun. 2019, 75 pages.

Japanese Patent Office, Notice of Reasons for Refusal issued to JP application No. 2022-145049 dated Dec. 20, 2022, 4 pages.

\* cited by examiner

TRAINING METHOD AND APPARATUS FOR A DISTRIBUTED MACHINE LEARNING MODEL AND MEDIUM

CROSS-REFERENCE TO RELATED APPLICATION(S)

This application claims priority to Chinese Patent Application No. 202111079943.4 filed Sep. 15, 2021, the disclosure of which is incorporated herein by reference in its entirety.

TECHNICAL FIELD

The present disclosure relates to the field of artificial intelligence technology, specifically the field of deep learning technology, and, in particular, to a training method and apparatus for a distributed machine learning model, a device, and a medium.

BACKGROUND

With the development of artificial intelligence technology, machine learning is more and more widely used in various scenarios.

With the popularization of distributed machine learning, a privacy protection problem arises. For the training of a machine learning model, data samples provided by multiple parties are often required for joint training. However, there are privacy protection requirements for data samples held by multiple parties, and the data samples held by multiple parties are not desired to be disclosed or acquired by other parties. Multiple parties may even need to train a portion of the machine learning model separately. Moreover, the data of this portion of the model during the training process is not desired to be acquired by other parties.

In the related art, with respect to the preceding requirements, a trusted third party is generally used for coordination such that privacy data that is not expected to be exposed to other participants is placed in and processed by the trusted third party. In the related art, however, there is still a possibility of malicious breach by a trusted third party, and data transmission is large in volume and low in efficiency during model training because there is a large volume of interactive data between multiple parties and the trusted third party.

SUMMARY

The present disclosure provides a training method and apparatus of a distributed machine learning model, a device and a medium to take into account the privacy data protection and model training efficiency of a training model trained by multiple parties.

According to an aspect of the present disclosure, a training method for a distributed machine learning model is provided. The method includes the steps below.

A first homomorphic encryption intermediate parameter and a second homomorphic encryption intermediate parameter are acquired.

A first interference parameter is generated. Moreover, a first encryption interference parameter is formed by encrypting the first interference parameter by using a second homomorphic public key of a second participant.

Calculation is performed based on the first homomorphic encryption intermediate parameter, the second homomorphic encryption intermediate parameter, the first encryption interference parameter and a homomorphic calculation function of a first submodel to generate a first encryption key parameter.

The first encryption key parameter is transmitted to the second participant and decrypted by the second participant by using a second homomorphic private key.

A first key parameter obtained by the decrypting by the second participant is acquired.

The first submodel is iteratively updated according to the first key parameter and the first interference parameter until training of the first submodel is completed.

According to another aspect of the present disclosure, a training apparatus of a distributed machine learning model is further provided. The apparatus includes an intermediate parameter acquisition module, an interference parameter formation module, a parameter generation module, a parameter decryption module, a first key parameter acquisition module and a submodel training module.

The intermediate parameter acquisition module is configured to acquire a first homomorphic encryption intermediate parameter and a second homomorphic encryption intermediate parameter.

The interference parameter formation module is configured to generate a first interference parameter and form a first encryption interference parameter by encrypting the first interference parameter by using the second homomorphic public key of a second participant.

The parameter generation module is configured to perform calculation based on the first homomorphic encryption intermediate parameter, the second homomorphic encryption intermediate parameter, the first encryption interference parameter and the homomorphic calculation function of a first submodel to generate a first encryption key parameter.

The parameter decryption module is configured to transmit the first encryption key parameter to the second participant for the second participant to decrypt the first encryption key parameter by using a second homomorphic private key.

The first key parameter acquisition module is configured to acquire a first key parameter obtained by the decrypting by the second participant.

The submodel training module is configured to iteratively update the first submodel according to the first key parameter and the first interference parameter until training of the first submodel is completed.

According to another aspect of the present disclosure, an electronic device is further provided. The electronic device includes at least one processor; and a memory communicatively connected to the at least one processor.

The memory stores instructions executable by the at least one processor to enable the at least one processor to execute the training method for a distributed machine learning model according to any embodiment of the present disclosure.

According to another aspect of the present disclosure, a non-transitory computer-readable storage medium storing a computer instruction is further provided. The computer instruction is for causing a computer to perform the training method for a distributed machine learning model according to any embodiment of the present disclosure.

According to another aspect of the present disclosure, a computer program product is further provided. The computer program product includes a computer program which, when executed by a processor, implements the training method for a distributed machine learning model according to any embodiment of the present disclosure.

According to the technology of the present disclosure, the privacy data protection and model training efficiency of a training model trained by multiple parties are taken into account.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

The solution provided by the embodiments of the present disclosure is described in detail below in conjunction with the drawings.

Figure 1:
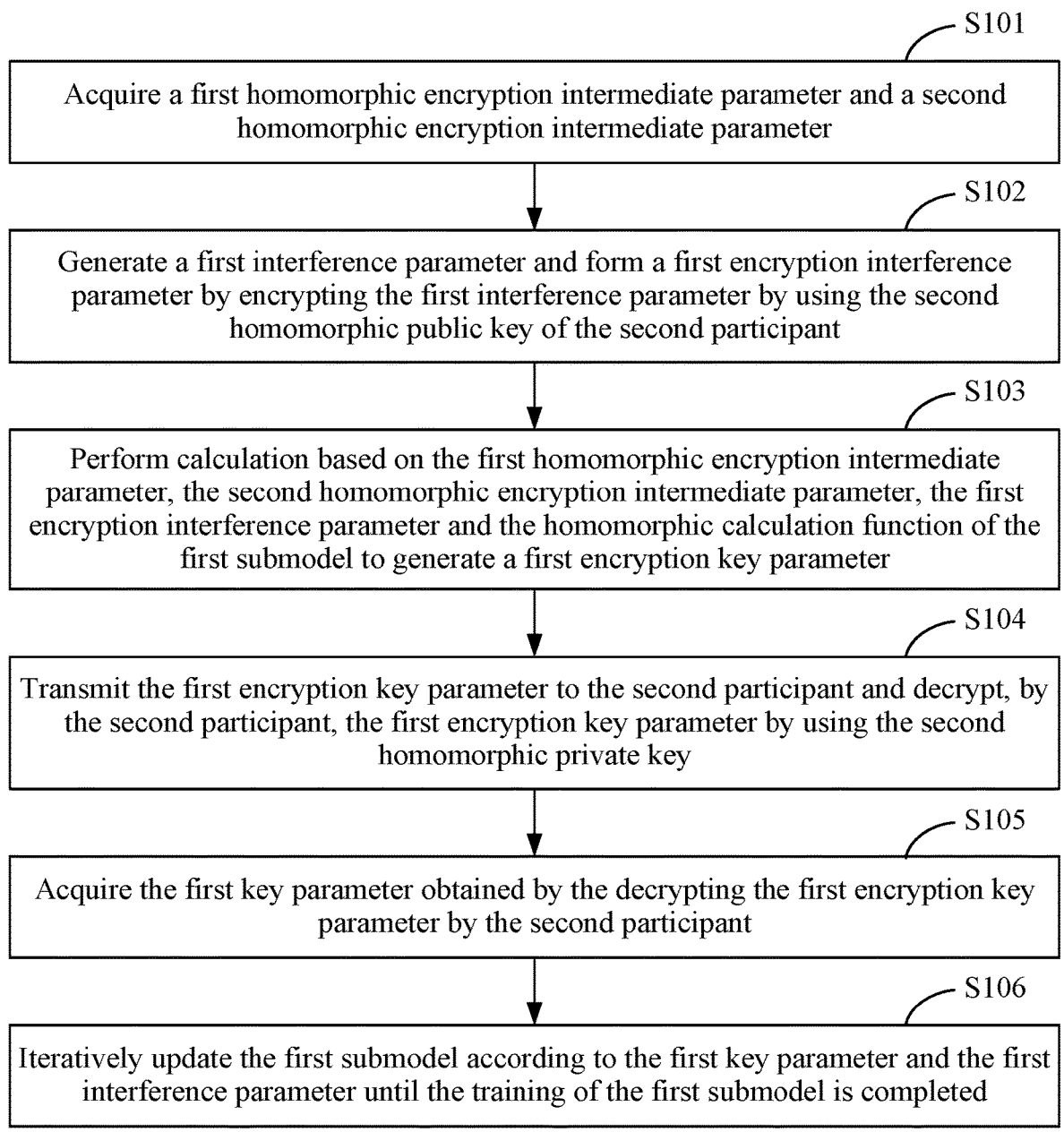
FIG. 1 is a schematic diagram of a training method for a distributed machine learning model according to an embodiment of the present disclosure.

FIG. 1 is a schematic diagram of a training method for a distributed machine learning model according to an embodiment of the present disclosure. The present disclosure may be applied to a case where multiple parties perform data interaction and complete the training of the machine learning model under privacy protection requirements. The method is executable by a training apparatus of a distributed machine learning model. The apparatus may be implemented in hardware and/or software and may be configured in an electronic device. The electronic device may be a device belonging to any participant. In the scenario of multi-party joint training, generally, at least two participants participate in the model training. Moreover, each participant may have an independent electronic device, and multiple participants interact to complete the model training. This embodiment is described from the perspective of any one of the participants. The model training process of each participant is basically the same.

Referring to FIG. 1, the method specifically includes the steps below.

In S101, a first homomorphic encryption intermediate parameter and a second homomorphic encryption intermediate parameter are acquired.

The first homomorphic encryption intermediate parameter is data obtained by encrypting a first training intermediate parameter by using the second homomorphic public key of the second participant. The first training intermediate parameter is an intermediate parameter generated by training the first submodel by the first participant based on first sample data. The second homomorphic encryption intermediate parameter is data obtained by encrypting a second training intermediate parameter by using the second homomorphic public key of the second participant. The second training intermediate parameter is an intermediate parameter generated by training the second submodel by the second participant based on second sample data. The machine learning model is composed of respective local submodels of at least two participants.

At least two participants participate in the training of the machine learning model. The machine learning model is composed of a local submodel of each of at least two participants. Each submodel is a model to be trained, and the training process of each submodel is private and needs to be kept confidential. The first participant may be any one of multiple participants participating in the model training. The second participant may be other participants excluding the first participant among the multiple participants participating in the model training. The second participant may be one or more. The first submodel may be a local submodel of the first participant. The second submodel may be a local submodel of the second participant.

The first sample data may be sample data used by the first participant for training the first submodel. The second sample data may be sample data used by the second participant for training the second submodel. Objects corresponding to sample data held by participants overlap, but the attribute data of the objects are different. For example, in an online shopping platform or a food delivery platform, each platform party is a participant in model training, and training objects of platform parties overlap and are based on the same users. Each participant holds different attribute data of the users. For example, the online shopping platform holds online shopping related data of the users. Moreover, the food delivery platform holds related data recorded by the users in the food delivery platform. Regardless of the online shopping platform or the food delivery platform, it is necessary to perform invisible processing on the user privacy data or hide the user privacy data, and then use the online shopping information or food delivery information on each platform. The submodel trained by each participant is a data processing submodel related to attribute data held by each platform. The machine training model obtained by combining submodels after training can combine various attribute data of users to obtain the data required by the platform. The sample data of at least one participant has a tag. For example, whether users have a risk of breaching contracts as a tag is known by the online shopping platform, and the sample data of the online shopping platform has a tag. Sample data provided by other participants may not have a tag.

Specifically, the first participant trains the first submodel based on the first sample data to obtain the first training intermediate parameter. Moreover, the second participant trains the second submodel based on the second sample data to obtain the second training intermediate parameter. In the preceding training process, the sample data held by the participant is input into the submodel for calculation. The training intermediate parameters include parameters output by the submodel and configured to perform the calculation of target loss function and gradient function. The training intermediate parameters of the submodel need to be performed calculation, such as the target loss function and the gradient function, with training intermediate parameters of other participants, thereby determining whether the submodel training converges, and performing iterative updating on the gradient.

The second participant encrypts the second training intermediate parameter through the second homomorphic public key to obtain the second homomorphic encryption intermediate parameter and then, sends the second homomorphic encryption intermediate parameter to the first participant. The first homomorphic encryption intermediate parameter is obtained by encrypting the first training intermediate parameter by the first participant through the second homomorphic public key sent by the second participant.

Each participant has own homomorphic keypair. The homomorphic keypair includes a homomorphic private key and a homomorphic public key. The homomorphic public key may be provided for other participants. Moreover, the homomorphic private key is kept by the participant. Specifically, the second participant generates a second homomorphic keypair. The second homomorphic keypair includes a second homomorphic public key and a second homomorphic private key. The second homomorphic private key is used to decrypt data encrypted by the second homomorphic public key. The second homomorphic public key is used by the second participant to encrypt the second training intermediate parameter according to the second homomorphic public key. The second participant sends the second homomorphic public key to the first participant. The first participant can encrypt the first training intermediate parameter according to the second homomorphic public key. Then, the second participant can decrypt the data encrypted by the first participant according to the second homomorphic public key through the second homomorphic private key.

In S102, a first interference parameter is generated, and then a first encryption interference parameter is formed by encrypting the first interference parameter by using the second homomorphic public key of the second participant.

The first interference parameter may be an interference parameter generated by the first participant and is used to scramble the model training process of the first participant, thereby ensuring privacy.

Optionally, the first interference parameter is a random number, for example, may be a random integer or a random floating-point number. The value of the random floating-point number may be any floating-point number between 0 and 1.

The first participant generates the first interference parameter and forms the first encryption interference parameter by encrypting the first interference parameter by using the second homomorphic public key of the second participant.

In S103, calculation is performed based on the first homomorphic encryption intermediate parameter, the second homomorphic encryption intermediate parameter, the first encryption interference parameter and the homomorphic calculation function of the first submodel to generate a first encryption key parameter.

The homomorphic calculation function can be used to calculate the homomorphic encryption data. The encrypted data is not leaked during the calculation. Moreover, the calculated result is still the encrypted result. The encrypted result obtained by calculating the homomorphic encryption data by the homomorphic calculation function when decrypted is the same as the result obtained by calculating the plaintext data corresponding to the homomorphic encryption data. Therefore, the homomorphic encryption technology does not affect the calculation process, and the calculation process can be kept confidential.

The homomorphic calculation function in the preceding operation is used to calculate the first encryption key parameter. The first encryption key parameter includes determination parameters of training end condition and/or iterative update parameters of the first submodel, for example, a loss value calculated by the target loss function or an iteratively updated gradient value.

Specifically, when the public key is used to encrypt data to generate the encrypted data, and the homomorphic calculation function is used to calculate the encrypted data to obtain the encrypted result, the party having the private key can decrypt the encrypted result through the private key.

The first participant may calculate the first homomorphic encryption intermediate parameter, the second homomorphic encryption intermediate parameter and the first encryption interference parameter through the homomorphic calculation function of the first submodel to generate the first encryption key parameter. It is to be noted that the first participant may calculate the first homomorphic encryption intermediate parameter and the second encrypted intermediate parameter through the homomorphic calculation function of the first submodel and superimpose the first encryption interference parameter on the calculation result through linear calculation or non-linear calculation, thereby generating the first encryption key parameter.

In an optional embodiment, performing calculation based on the first homomorphic encryption intermediate parameter, the second homomorphic encryption intermediate parameter, the first encryption interference parameter and the homomorphic calculation function of the first submodel to generate the first encryption key parameter includes performing calculation based on the first homomorphic encryption intermediate parameter, the second homomorphic encryption intermediate parameter and the homomorphic calculation function of the first submodel and superimposing the first encryption interference parameter on the calculation result based on the linear calculation to generate the first encryption key parameter.

Exemplarily, the first participant may calculate the first homomorphic encryption intermediate parameter and the second homomorphic encryption intermediate parameter through the homomorphic calculation function of the first submodel and superimpose the first encryption interference parameter on the calculation result through linear calculation, thereby generating the first encryption key parameter.

Exemplarily, the calculation may be performed in different linear calculation manners according to different forms of the calculation result. For example, the form of the intermediate parameter as the calculation result may be in the form of a set. For example, if the calculation result is in the form of a set, the first encryption interference parameter may be linearly superimposed on each element in the set through traversing the set, thereby obtaining the first encryption key parameter set.

In the optional embodiment, the first homomorphic encryption intermediate parameter and the second homomorphic encryption intermediate parameter are calculated through the homomorphic calculation function of the first submodel, and the first encryption interference parameter is superimposed on the calculation result based on the linear calculation, thereby implementing the acquisition of the first encryption key parameter, improving the security of the data of the first participant, and avoiding a data breach.

In S104, the first encryption key parameter is transmitted to the second participant for the second participant to decrypt the first encryption key parameter by using the second homomorphic private key.

The first participant transmits the first encryption key parameter to the second participant. Moreover, the first participant decrypts the received first encryption key parameter by using the second homomorphic private key, thereby generating the first key parameter.

It is to be noted that, because the first key parameter generated by the second participant contains the first interference parameter, the second participant cannot obtain the first key parameter that does not contain the first interference parameter. That is, the second participant cannot obtain the data such as the loss value and the gradient parameter of the first submodel of the first participant after the first submodel is calculated by the objective function. Therefore, it is impossible to infer the objective function and gradient function used by the first participant. Moreover, the information such as the submodel training end condition and gradient precision of the first participant cannot be obtained, thereby ensuring the privacy of the model training process of the first participant.

In S105, the first key parameter obtained by the decrypting by the second participant is acquired.

In S106, the first submodel is iteratively updated according to the first key parameter and the first interference parameter until the training of the first submodel is completed.

The first participant may extract the first interference parameter from the first key parameter to determine the final key parameter and iteratively update the first submodel by using the final determined key parameter until the training of the first submodel is completed.

It is to be noted that the first participant calculates the first homomorphic encryption intermediate parameter and the second homomorphic encryption intermediate parameter according to the homomorphic calculation function of the first submodel. If the first participant superimposes the first encryption interference parameter on the calculation result in a linear calculation manner, the first participant after receiving the first key parameter further needs to perform an inverse linear calculation operation on the first key parameter based on the first interference parameter. For example, if the linear calculation is addition, the inverse linear calculation may be subtraction.

In an optional embodiment, iteratively updating the first submodel according to the first key parameter and the first interference parameter until the training of the first submodel is completed includes performing inverse linear calculation on the first key parameter based on the first interference parameter and iteratively updating the first submodel according to the key parameter obtained by the inverse linear calculation until the training of the first submodel is completed.

If the first participant superimposes the first encryption interference parameter on the calculation result in a linear calculation manner, after receiving the first key parameter, the first participant needs to perform inverse linear calculation on the first key parameter according to the first interference parameter. Thus, the first interference parameter can be extracted from the first key parameter, and the key parameter obtained by the inverse linear calculation can be determined. Specifically, the inverse linear calculation on the first key parameter may be performed based on the first interference parameter by using a rule corresponding to the linear calculation. The first participant iteratively updates the first submodel according to the key parameter obtained by the inverse linear calculation until the training of the first submodel is completed. Each participant can hold the submodel that has been trained. When the machine learning model needs to be used for processing, the input data to be processed can be provided for each participant. After the submodel processes the input data, results can be summarized.

Taking the form of the first key parameter as a set as an example, if the rule of the linear calculation is to traverse each element in a first encryption interference set and linearly superimpose the same first encryption interference parameter for each element, the inverse linear calculation may be to traverse each element in a first key parameter set and subtract the first interference parameter from each element.

In the optional embodiment, the key parameter is determined in the inverse linear calculation manner. This corresponds to the step in which the first encryption interference parameter is superimposed on the calculation result by the first participant in the linear calculation manner and provides a solution for the preceding result determined in the linear calculation manner. Thus, the key parameter can be accurately determined according to the first interference parameter.

This embodiment of the present disclosure includes acquiring the first homomorphic encryption intermediate parameter and the second homomorphic encryption intermediate parameter; generating the first interference parameter and forming the first encryption interference parameter by encrypting the first interference parameter by using the second homomorphic public key of the second participant; performing calculation based on the first homomorphic encryption intermediate parameter, the second homomorphic encryption intermediate parameter, the first encryption interference parameter and the homomorphic calculation function of the first submodel to generate the first encryption key parameter; transmitting the first encryption key parameter to the second participant, and decrypting, by the second participant, the first encryption key parameter by using the second homomorphic private key; acquiring the first key parameter obtained by the decrypting by the second participant; and iteratively updating the first submodel according to the first key parameter and the first interference parameter until the training of the first submodel is completed. The preceding solution implements the protection of the privacy data and the training process data of the training model trained by multiple parties. At the same time, there is no need to use the trusted third party for coordination, avoiding the possibility of a malicious data breach by the trusted third party, avoiding a large volume of data interacted between the multiple parties and the trusted third party, and reducing the data transmission amount during the model training process, thereby improving the efficiency of model training.

It is to be noted that, in order to ensure the accuracy of the submodel trained by the first participant and the second participant, the object of the sample data corresponding to the first participant and the second participant is consistent. Therefore, it is necessary to acquire the sample data belonging to the same user of the sample data of the first participant and the second participant as the first sample data corresponding to the first participant and the second sample data corresponding to the second participant.

In an optional embodiment, before the first homomorphic encryption intermediate parameter and the second homomorphic encryption intermediate parameter are acquired, the intersection identifier of sample data of the first participant and sample data of the second participant is determined. Moreover, the sample data of at least one participant is marked by a tag.

The sample data of at least one participant is marked by a tag. The tag may be the result of model training. For example, if the sample data is the user breach-contract coefficient risk, the corresponding tag may be risky or non-risky.

Exemplarily, the intersection operation may be performed on the sample data of the first participant and the sample data of the second participant in a manner of private set intersection (PSI). The PSI can obtain the intersection of the sample data held by participants without any additional information being disclosed by each participant. The additional information may be any information excluding the intersection of the sample data of participants.

Specifically, PSI calculation is performed on the sample data of the first participant and the sample data of the second participant to determine the sample data intersection jointly held by the first participant and the second participant and the intersection identifier of the sample data. The intersection identifier of the sample data may be, for example, a user ID number or a user name. The first participant and the second participant can only obtain the intersection identifier of the sample data, but cannot obtain additional information excluding the intersection identifier of the sample data, thereby ensuring the security of the sample data of each participant. The first participant obtains the first sample data through the intersection identifier of the sample data determined according to the PSI calculation. The second participant obtains the second sample data through the intersection identifier of the sample data determined according to the PSI calculation.

For example, the sample data of the first participant is user ID number data and user credit data. Moreover, the sample data of the second participant is user ID number data and user age data. The intersection identifier of the sample data of the first participant and the sample data of the second participant can be determined as a user ID number by PSI calculation. Moreover, the intersection identifier of the sample data of participants can be determined by the user ID number. However, the first participant can only obtain the sample data corresponding to the user ID number in the sample data of the second participant, cannot obtain identifiers of other sample data in the sample data of the second participant, such as the user age, and cannot obtain the user age data. Similarly, the second participant cannot obtain identifiers of other sample data in the sample data of the first participant, such as the user credit, and cannot obtain the user credit data.

In the optional embodiment, the intersection identifier of the sample data of the first participant and the sample data of the second participant is determined in the manner of PSI calculation. Thus, the first participant can determine the first sample data according to the intersection identifier of the sample data, and the second participant can determine the second sample data according to the intersection identifier of the sample data, thereby ensuring the consistency of the sample data. In addition, in a manner of calculating the intersection of the sample data by the PSI, each participant cannot obtain other additional information excluding the intersection identifier of the sample data, thereby ensuring the security of sample data of each participant. By marking a tag on the sample data of at least one participant, the category of the model training result is determined.

Figure 2:
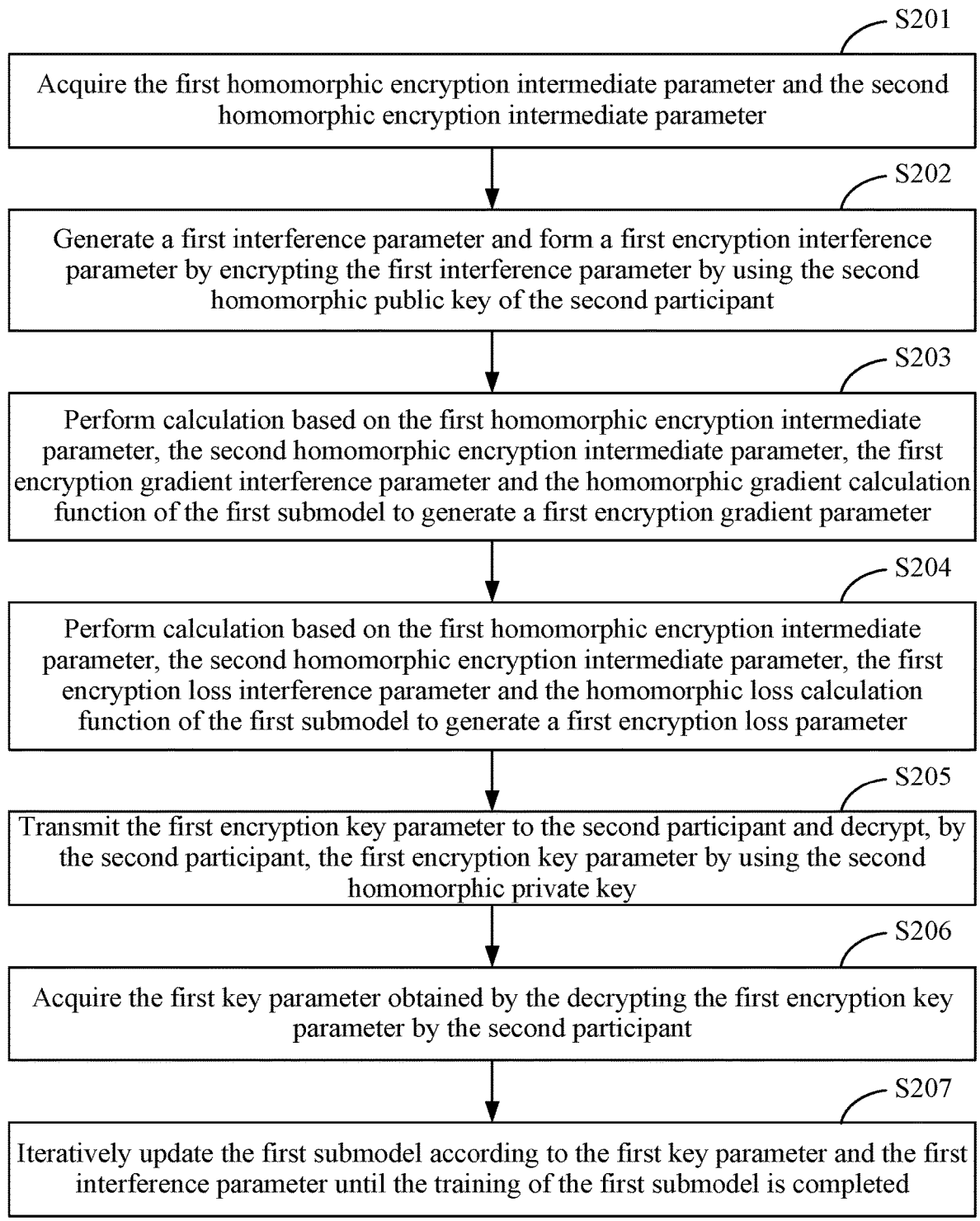
FIG. 2 is a schematic diagram of another training method for a distributed machine learning model according to an embodiment of the present disclosure.

FIG. 2 is a schematic diagram of another training method for a distributed machine learning model according to an embodiment of the present disclosure. This embodiment is an alternative solution based on the preceding embodiment. Referring to FIG. 2, the training method for a distributed machine learning model provided by this embodiment includes the steps below.

In S201, the first homomorphic encryption intermediate parameter and the second homomorphic encryption intermediate parameter are acquired.

The first homomorphic encryption intermediate parameter is data obtained by encrypting the first training intermediate parameter by using the second homomorphic public key of the second participant. The first training intermediate parameter is an intermediate parameter generated by training the first submodel by the first participant based on first sample data. The second homomorphic encryption intermediate parameter is data obtained by encrypting the second training intermediate parameter by using the second homomorphic public key of the second participant. The second training intermediate parameter is an intermediate parameter generated by training the second submodel by the second participant based on second sample data. The machine learning model is composed of respective local submodels of at least two participants.

The first training intermediate parameter may include a first intermediate loss parameter and a first intermediate gradient parameter. The second training intermediate parameter may include a second intermediate loss parameter and a second intermediate gradient parameter. Correspondingly, the first homomorphic encryption intermediate parameter may include a first homomorphic encryption loss parameter and a first homomorphic encryption gradient parameter. Moreover, the second homomorphic encryption intermediate parameter may include a second homomorphic encryption loss parameter and a second homomorphic encryption gradient parameter. The loss parameter may represent the convergence degree of the model. The gradient parameter may update the parameters in the model.

Optionally, before performing parameter training through each local submodel, each participant may perform an initialization operation on the submodel and randomly set the current loss parameter during the initialization process. For example, the current loss parameter may be set to 0.

It is to be noted that during the training process of the machine learning model, since the order of magnitude of the sample data is large, the generated parameters are usually presented in the form of a set. The elements contained in the set may be intermediate parameters generated by the model during the training process. For example, a loss parameter set includes loss intermediate parameters, and a gradient parameter set includes gradient intermediate parameters. Therefore, the existence forms of the loss parameters and the gradient parameters obtained by model training involved in this embodiment are in the form of set. Moreover, the existence forms of the encryption loss parameters and the encryption gradient parameters obtained by homomorphic encryption are also in the form of set.

In S202, a first interference parameter is generated, and then the first encryption interference parameter is formed by encrypting the first interference parameter by using the second homomorphic public key of the second participant.

The first interference parameter includes a first gradient interference parameter and a first loss interference parameter. A first encryption gradient interference parameter and a first encryption loss interference parameter are formed by encrypting the first gradient interference parameter and the first loss interference parameter by using the second homomorphic public key of the second participant.

The first gradient interference parameter and the first loss interference parameter are random numbers, for example, may be random integers or random floating-point numbers. The random numbers of the first gradient interference parameter and the first loss interference parameter may be set to be the same or different. The specific may be manually set by a person skilled in the art according to actual requirements.

In S203, calculation is performed based on the first homomorphic encryption intermediate parameter, the second homomorphic encryption intermediate parameter, the first encryption gradient interference parameter and the homomorphic gradient calculation function of the first submodel to generate a first encryption gradient parameter.

Calculation is performed based on a first homomorphic encryption gradient parameter in the first homomorphic encryption intermediate parameter, a second homomorphic encryption gradient parameter in the second homomorphic encryption intermediate parameter, the first encryption gradient interference parameter and the homomorphic gradient calculation function of the first submodel to generate the first encryption gradient parameter.

The homomorphic gradient calculation function may be used to perform gradient calculation on the first homomorphic encryption gradient parameter and the second homomorphic encryption gradient parameter. Exemplarily, the first participant performs gradient calculation on the first homomorphic encryption gradient parameter and the second homomorphic encryption gradient parameter through the homomorphic gradient calculation function of the first submodel and linearly superimposes the first encryption gradient interference parameter in the gradient calculation result obtained by calculation. For example, the gradient set obtained by the calculation result may be traversed. The first encryption gradient interference is linearly superimposed on each element in the gradient set. Moreover, the result superimposed by the linear superposition is used as the first encryption gradient parameter.

In S204, calculation is performed based on the first homomorphic encryption intermediate parameter, the second homomorphic encryption intermediate parameter, the first encryption loss interference parameter and the homomorphic loss calculation function of the first submodel to generate a first encryption loss parameter.

Calculation is performed based on the first homomorphic encryption loss parameter in the first homomorphic encryption intermediate parameter, the second homomorphic encryption loss parameter in the second homomorphic encryption intermediate parameter, the first encryption loss interference parameter and the homomorphic loss calculation function of the first submodel to generate the first encryption loss parameter.

The homomorphic loss calculation function may be used to perform loss calculation on the first homomorphic encryption loss parameter and the second homomorphic encryption loss parameter. Optionally, the setting of the homomorphic loss calculation function may be the same as or different from the setting of the preceding homomorphic gradient calculation function.

Exemplarily, the first participant performs loss calculation on the first homomorphic encryption loss parameter and the second homomorphic encryption loss parameter through the homomorphic loss calculation function of the first submodel and linearly superimposes the first encryption loss interference parameter in the loss calculation result obtained by calculation. For example, the loss set obtained by the calculation result may be traversed. The first encryption loss interference is linearly superimposed on each element in the loss set. Moreover, the result superimposed by the linear superposition is used as the first encryption loss parameter.

In S205, the first encryption key parameter is transmitted to the second participant and decrypted by the second participant by using the second homomorphic private key.

The first encryption key parameter includes the first encryption loss parameter and the first encryption gradient parameter. Specifically, the first participant transmits the first encryption loss parameter and the first encryption gradient parameter to the second participant for the second participant to decrypt the first encryption loss parameter and the first encryption gradient parameter by using the second homomorphic private key.

In S206, the first key parameter obtained by the decrypting by the second participant is acquired.

The first key parameter includes a first gradient parameter and a first loss parameter. Specifically, the first participant acquires the first gradient parameter and the first loss parameter decrypted by the second participant.

In S207, the first submodel is iteratively updated according to the first key parameter and the first interference parameter until the training of the first submodel is completed.

According to the first gradient parameter in the first key parameter and the first gradient interference parameter in the first interference parameter, the final gradient key parameter is determined. According to the first loss parameter in the first key parameter and the first loss interference parameter in the first interference parameter, the final loss key parameter is determined. The final loss key parameter is used to determine whether the first submodel is convergent. If the first submodel is convergent, the training is completed. If the first submodel is not convergent, the final gradient key parameter is used to iteratively update the first submodel. Then, the first submodel returns to be executed the next round of training intermediate parameter calculation and key parameter calculation until the training of the first submodel of the first participant is completed.

In this embodiment of the present disclosure, by using the homomorphic loss calculation function of the first submodel, a targeted calculation of the first homomorphic encryption loss parameter and the second homomorphic encryption loss parameter is implemented. Moreover, the first encryption loss interference parameter is linearly superimposed on the calculation result to generate the first encryption loss parameter, improving the accuracy of determining the first encryption loss parameter. By using the homomorphic gradient calculation function of the first submodel, a targeted calculation of the first homomorphic encryption gradient parameter and the second homomorphic encryption gradient parameter is implemented. Moreover, the first encryption gradient interference parameter is linearly superimposed on the calculation result to generate the first encryption gradient parameter, improving the accuracy of determining the first encryption gradient parameter.

It is to be noted that, to ensure that the second participant can train the second submodel according to the finally determined key parameters, the second participant needs to receive the first homomorphic public key of the first participant for the second participant to encrypt the first training intermediate parameter and the second training intermediate parameter by using the first homomorphic public key.

An optional embodiment includes generating a first homomorphic keypair, where the first homomorphic keypair includes the first homomorphic public key and a first homomorphic private key; sending the first homomorphic public key to the second participant; and receiving the second homomorphic public key in a second homomorphic keypair generated and sent by the second participant.

The first participant generates the first homomorphic keypair. The first homomorphic keypair includes the first homomorphic public key and the first homomorphic private key. The second participant generates the second homomorphic keypair. The second homomorphic keypair includes the second homomorphic public key and the second homomorphic private key. The first participant sends the first homomorphic public key to the second participant. The second participant sends the second homomorphic public key to the first participant.

In the optional embodiment, the first homomorphic keypair is generated, and the first homomorphic public key in the first homomorphic keypair is sent to the second participant. Thus, the second participant can encrypt the first training intermediate parameter and the second training intermediate parameter according to the first homomorphic public key, thereby ensuring that the second participant can determine key parameters subsequently and train the second submodel according to the key parameters.

Figure 3:
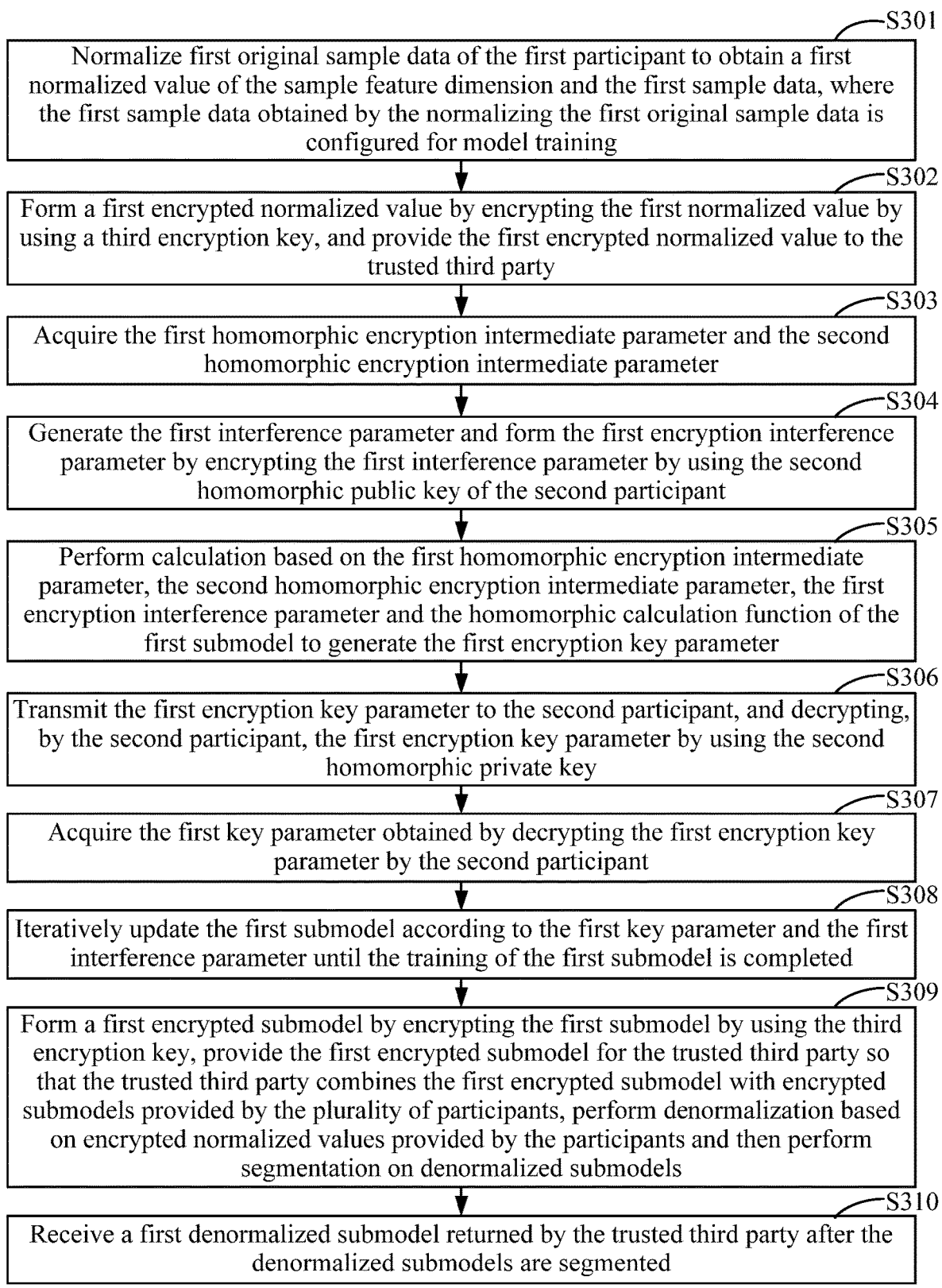
FIG. 3 is a schematic diagram of another training method for a distributed machine learning model according to an embodiment of the present disclosure.

FIG. 3 is a schematic diagram of another training method for a distributed machine learning model according to an embodiment of the present disclosure. This embodiment is an alternative solution based on the preceding embodiment. The normalization processing of sample data and inverse normalization processing of the machine training model are added. Referring to FIG. 3, the training method for a distributed machine learning model provided by this embodiment includes the steps below.

In S301, first original sample data of the first participant is normalized to obtain a first normalized value of the sample feature dimension and the first sample data. Moreover, the first sample data obtained by normalizing the first original sample data is configured for model training.

The first original sample data has different base units and orders of magnitude under different feature dimensions. If the value levels of different feature dimensions of the first original sample data differ greatly, and the first participant directly uses the first original sample data to train the model, the role of the feature dimension with a higher value level in the model training is highlighted, thereby weakening the role of the feature dimension with a lower value level in the model training. For example, the sample feature dimension may be user monthly income, the number of user overdue repayment days or user credit. The order of magnitude of the user monthly income is relatively large, and the corresponding value level is relatively high. The number of user overdue repayment days is smaller than the order of magnitude of the user monthly income, and the corresponding value level is relatively low.

The first original sample data of the first participant is normalized by using a data normalization algorithm. The data normalization algorithm may be, for example, a min-max normalization algorithm, a zero-mean normalization algorithm, a log function conversion algorithm or a normalization algorithm. The data normalization algorithm may be selected by a person skilled in the art according to actual requirements. This is not limited by this embodiment.

The first original sample data of the first participant is normalized by the data normalization algorithm to obtain the first normalized value of the sample feature dimension and the first sample data. The first normalized value may include a first standard deviation and a first mean of the sample feature dimension. The first sample data obtained by normalizing the first original sample data is configured for model training.

In S302, a first encrypted normalized value is formed by encrypting the first normalized value by using a third encryption key. Moreover, the first encrypted normalized value is provided for the trusted third party.

The trusted third party may be a hardware-based trusted execution environment (TEE) or a secure multi-party computation (MPC) protocol.

The trusted third party may generate the third encryption key. The third encryption key may be a symmetric encryption key or an asymmetric encryption key. The trusted third party sends the third encryption key to each participant for each participant to encrypt the data according to the third encryption key.

In an optional embodiment, if the third encryption key is a symmetric encryption key, the trusted third party sends the third encryption key to the first participant and the second participant. The first participant forms the first encrypted normalized value by encrypting the first normalized value by using the third encryption key and provides the formed first encrypted normalized value for the trusted third party. Similarly, the second participant forms a second encrypted normalized value by encrypting a second normalized value by using the third encryption key and provides the formed second encrypted normalized value for the trusted third party.

In another optional embodiment, if the third encryption key is an asymmetric key, the third encryption key includes a third encryption public key and a third encryption private key. The trusted third party sends the third encryption public key to the first participant and the second participant. The first participant forms the first encrypted normalized value by encrypting the first normalized value by using the third encryption public key and provides the formed first encrypted normalized value for the trusted third party. Similarly, the second participant forms the second encrypted normalized value by encrypting the second normalized value by using the third encryption public key and provides the formed second encrypted normalized value for the trusted third party.

In S303, the first homomorphic encryption intermediate parameter and the second homomorphic encryption intermediate parameter are acquired.

It is to be noted that, to ensure that the precision of the first training intermediate parameter generated by training the first submodel is uniform, the precision of the first training intermediate parameter may be adjusted, thereby ensuring that the precision of the data obtained by subsequent operations is uniform.

In an optional embodiment, acquiring the first homomorphic encryption intermediate parameter includes generating the first training intermediate parameter by training the first submodel based on the first sample data; converting the floating-point number in the first training intermediate parameter to a first large integer according to a set precision; encoding the integer value in the first large integer to convert the first large integer to a first positive integer; and obtaining the first homomorphic encryption intermediate parameter by encrypting the first positive integer by using the second homomorphic public key of the second participant.

The precision may be set by a person skilled in the art according to actual requirements, specifically, may be the number of digits reserved after the decimal point of the value. For example, the precision may be set to 2 digits reserved after the decimal point of the value.

The floating-point number in the first training intermediate parameter is converted to the first large integer by the large integer conversion function according to the set precision. For example, the large integer conversion function may be a Gaussian function or a ceil function. The integer value in the first large integer is encoded to convert to the first positive integer. Specifically, the integer value in the first large integer is encoded to convert to the first positive integer by using at least one of the following encoding modes: true form, two's complement or ones' complement. The first homomorphic encryption intermediate parameter is obtained by encrypting the first positive integer by using the second homomorphic public key of the second participant.

In the optional embodiment, the floating-point number in the first training intermediate parameter is converted to the first large integer by the set precision. Moreover, the integer value in the first large integer is encoded to convert to the first positive integer. Thus, the precision of the first training intermediate parameter is uniform, thereby ensuring that the precision of the data obtained by subsequent operations is also uniform.

In S304, the first interference parameter is generated, and then the first encryption interference parameter is formed by encrypting the first interference parameter by using the second homomorphic public key of the second participant.

In S305, calculation is performed based on the first homomorphic encryption intermediate parameter, the second homomorphic encryption intermediate parameter, the first encryption interference parameter and the homomorphic calculation function of the first submodel to generate the first encryption key parameter.

In S306, the first encryption key parameter is transmitted to the second participant and decrypted by the second participant by using the second homomorphic private key.

In S307, the first key parameter obtained by the decrypting by the second participant is acquired.

In S308, the first submodel is iteratively updated according to the first key parameter and the first interference parameter until the training of the first submodel is completed.

Since the precision processing is performed on the first training intermediate parameter, and the floating-point number in the first training intermediate parameter is finally converted to the first positive integer, the subsequently generated first key parameter is also data performed by the precision processing. Therefore, the first key parameter needs to be reversed. A precision scaling operation may be performed on the first key parameter, thereby restoring the original precision.

In an optional embodiment, iteratively updating the first submodel according to the first key parameter and the first interference parameter includes performing a de-interference operation on the first key parameter based on the first interference parameter; decoding the first key parameter having undergone the de-interference operation, and scaling the first key parameter according to the set precision to convert the first key parameter to a floating-point number; and iteratively updating the first submodel by using the converted first key parameter in a form of the floating-point number.

Decoding the first key parameter includes the steps below. First, the value type of the first key parameter is converted from an original positive number to an integer. Integers include positive numbers or negative numbers. Next, the converted integer is scaled according to precision. The precision is set to match the precision set at the time of encoding. Finally, the integer converted according to the precision is converted to a floating-point number. The first submodel is iteratively updated by using the converted first key parameter in the form of a floating-point number.

In the optional embodiment, by using the reverse processing, the first key parameter having undergone de-interference is decoded, scaled according to the set precision and converted to the floating-point number. Therefore, the precision of the first key parameter is scaled, and the first key parameter is restored to the original precision, thereby ensuring the consistency of the value type of the data.

In S309, a first encrypted submodel is formed by encrypting the first submodel by using the third encryption key. The first encrypted submodel is provided for the trusted third party, and so that the trusted third party combines the first encrypted submodel with encrypted submodels provided by the plurality of participants. Moreover, denormalization is performed on combined encrypted submodels based on encrypted normalized values provided by the participants, and then segmentation is performed on denormalized submodels.

In an optional embodiment, if the third encryption key sent by the trusted third party is a symmetric encryption key, the first participant forms the first encrypted submodel by encrypting the first submodel by using the third encryption key and provides the first encrypted submodel for the trusted third party. Similarly, the second participant forms a second encrypted submodel by encrypting the second submodel by using the third encryption key and provides the second encrypted submodel for the trusted third party.

The trusted third party uses the third encryption key to decrypt the received first encrypted submodel and first encrypted normalized value provided by the first participant and the received second encrypted submodel and second encrypted normalized value provided by the second participant. The trusted third party combines the decrypted submodels of the first participant and the second participant and denormalizes the combined submodel based on the decrypted normalized values of the first participant and the second participant. The denormalized submodel is segmented into a first denormalized submodel and a second denormalized submodel. The trusted third party encrypts the denormalized submodel by using the third encryption key and sends the encrypted submodel to each participant.

In another optional embodiment, if the third encryption key sent by the trusted third party is an asymmetric encryption key, the first participant forms the first encrypted submodel by encrypting the first submodel by using the third encryption public key sent by the trusted third party and provides the first encrypted submodel for the trusted third party. Similarly, the second participant forms the second encrypted submodel by encrypting the second submodel by using the third encryption public key sent by the trusted third party and provides the second encrypted submodel for the trusted third party.

The trusted third party uses the third encryption private key to decrypt the received first encrypted submodel and the received first encrypted normalized value provided by the first participant and the received second encrypted submodel and the received second encrypted normalized value provided by the second participant. The trusted third party combines the decrypted submodels of the first participant and the second participant and denormalizes the combined submodel based on the decrypted normalized values of the first participant and the second participant. The denormalized submodel is segmented into a first denormalized submodel and a second denormalized submodel. The trusted third party encrypts the denormalized submodel by using the third encryption private key and sends the encrypted submodel to each participant.

In S310, the first denormalized submodel returned by the trusted third party after the denormalized submodels being segmented is received.

In an optional embodiment, if the third encryption key sent by the trusted third party is a symmetric encryption key, each participant uses the third encryption key to decrypt each received denormalized submodel after the denormalized submodels being segmented returned by the trusted third party, thereby obtaining the decrypted denormalized submodel.

In another optional embodiment, if the third encryption key sent by the trusted third party is an asymmetric encryption key, each participant uses the third encryption public key to decrypt each received denormalized submodel after the denormalized submodels being segmented returned by the trusted third party, thereby obtaining the decrypted denormalized submodel.

In this optional embodiment, the original sample data of each participant is normalized, implementing the unification of base units and mathematics of different characteristic dimensions of the sample data, thereby avoiding inaccurate training results due to excessive differences in value levels of different characteristic dimensions. The normalized value of each participant and the submodel trained by using the normalized value are sent to the trusted third party, and the submodel of each participant is denormalized by the trusted third party, thereby ensuring the security of the data and avoiding the data breach.

The embodiment of the present disclosure provides a training method for a distributed machine learning model. This embodiment takes two participants as an example for description.

The complete training process of the model can be divided into a model training stage and a model restoration stage. It is assumed that there are two participants: participant A (sample data without tags) and participant B (sample data with tags). There is also a trusted third party C that can run the TEE.

The model training process includes the steps below.

In S1, the participant A generates the homomorphic keypair of A.

In S2, the participant B generates the homomorphic keypair of B.

In S3, the trusted third party C generates the non-homomorphic encryption keypair of A.

In S4, the trusted third party C generates the non-homomorphic encryption keypair of B.

In S5, the participant A sends the homomorphic public key of A to B.

In S6, the participant B sends the homomorphic public key of B to A.

In S7, the trusted third party C sends the non-homomorphic encryption public key of A to A.

In S8, the trusted third party C sends the non-homomorphic encryption public key of B to B.

In S9, the participant A initializes a local submodel W-A (no constant term), and the current loss Loss-Last is set to 0.

In S10, the participant B initializes a local submodel W-B (with a constant term), and the current loss Loss-Last is set to 0.

In S11, the intersection of sample sets is determined through the PSI process, thereby determining the sample data used in this training from respective database.

In S12, the participant A normalizes the sample data set of A to obtain the standard deviation and the mean of each feature dimension.

In S13, the participant B normalizes the sample data set of B to obtain the standard deviation and the mean of each feature dimension and tag.

In S14, the participant A encrypts the standard deviation and the mean of each feature dimension in the data set of A by using the non-homomorphic encryption public key sent by the trusted third party C and then sends the encrypted standard deviation and mean to the trusted third party C.

In S15, the participant B encrypts the standard deviation and the mean of each feature dimension and tag in the data set of B by using the non-homomorphic encryption public key sent by the trusted third party C and then sends the encrypted standard deviation and mean to the trusted third party C.

In S16, the trusted third party C transmits the received encrypted normalized data to the TEE, decrypts the data in the TEE quarantine area and obtains the standard deviation and the mean of all feature dimensions and tags. This is prepared for the subsequent inverse normalization of models.

In S17, based on the original sample data of A, the participant A executes a calculation based on the submodel W-a to obtain a parameter set P-A1, that is, the first training intermediate parameter. The first training intermediate parameter contains key parameters for calculating the gradient and the loss.

Parameters included in the parameter set P-A1 are the gradient intermediate parameters and the loss intermediate parameters calculated by sample data based on the model W-a.

In S18, based on the original sample data of B, the participant B executes a calculation based on the submodel W-b to obtain a parameter set P-B1, that is, the second training intermediate parameter. The second training intermediate parameter contains key parameters for calculating the gradient and the loss.

Parameters included in the parameter set P-B1 are the gradient intermediate parameters and the loss intermediate parameters calculated by sample data based on the model W-b.

In S19, the participant A converts the floating-point numbers in the parameter set P-A1 to large integers according to the precision (the number of digits after the decimal point is reserved) to obtain a parameter set P-A2.

In S20, the participant B converts the floating-point numbers in the parameter set P-B1 to large integers according to the precision (the number of digits after the decimal point is reserved) to obtain a parameter set P-B2.

In S21, the participant A encodes the integer values in the parameter set P-A2, thereby converting negative numbers to positive integers to obtain a parameter set P-A3.

In S22, the participant B encodes the integer values in the parameter set P-B2, thereby converting negative numbers to positive integers to obtain a parameter set P-B3.

In S23, the participant A encrypts all positive integers in the parameter set P-A3 by using the homomorphic public key of A to obtain a parameter set P-A4-A.

In S24, the participant B encrypts all positive integers in the parameter set P-B3 by using the homomorphic public key of B to obtain a parameter set P-B4-B, that is, the second homomorphic encryption intermediate parameter.

In S25, the participant A sends the parameter set P-A4-A to the participant B.

In S26, the participant B sends the parameter set P-B4-B to the participant A.

In S27, the participant A receives the encrypted parameter set P-B4-B sent by the participant B.

In S28, the participant B receives the encrypted parameter set P-A4-A sent by the participant A.

In S29, the participant A encrypts all positive integers in the parameter set P-A3 by using the homomorphic public key of the participant B to obtain a parameter set P-A4-B, that is, the first homomorphic encryption intermediate parameter.

In S30, the participant B encrypts all positive integers in the parameter set P-B3 by using the homomorphic public key of the participant A to obtain a parameter set P-B4-A.

In S31, the participant A generates a random number R-A1 (that is, the first interference parameter) and encrypts the random number R-A1 by using the homomorphic public key of the participant B to obtain R-A1-B. R-A1-B is the first encryption interference parameter.

In S32, the participant B generates a random number R-B1 and encrypts the random number R-B1 by using the homomorphic public key of the participant A to obtain R-B1-A.

In S33, the participant A executes a homomorphic operation function F1, and based on P-A4-B, P-B4-B and R-A1-B, obtains a parameter set G-A1-B, that is, the first encryption gradient parameter. The homomorphic operation function F1 is equivalent to the gradient calculation function of the participant A.

In S34, The participant B executes a homomorphic operation function F2, and based on P-B4-A, P-A4-A and R-B1-A, obtains a parameter set G-B1-A. The homomorphic operation function F2 is equivalent to the gradient calculation function of the participant B.

In S35, the participant A generates a random number R-A2 and encrypts the random number R-A2 by using the homomorphic public key of the participant B to obtain R-A2-B.

In S36, the participant B generates a random number R-B2 and encrypts the random number R-B2 by using the homomorphic public key of the participant A to obtain R-B2-A.

In S37, the participant A executes a homomorphic operation function F3, and based on P-A4-B, P-B4-B and R-A2-B, obtains a parameter set L-A1-B, that is, the first encryption loss parameter. The homomorphic operation function F3 is equivalent to the loss function of the participant A.

In S38, the participant B executes a homomorphic operation function F4, and based on P-B4-A, P-A4-A and R-B2-A, obtains a parameter set L-B1-A. The homomorphic operation function F4 is equivalent to the loss function of the participant B.

In S39, the participant A sends the encrypted parameter sets G-A1-B and L-A1-B to the participant B.

In S40, the participant B sends the encrypted parameter sets G-B1-A and L-B1-A to the participant A.

In S41, the participant A receives the encrypted parameter sets G-B1-A and L-B1-A sent by the participant B.

In S42, the participant B receives the encrypted parameter sets G-A1-B and L-A1-B sent by the participant A.

In S43, the participant A decrypts G-B1-A and L-B1-A by using the homomorphic private key of A to obtain parameter sets G-B2 and L-B2 and sends G-B2 and L-B2 to the participant B.

In S44, the participant B decrypts G-A1-B and L-A1-B by using the homomorphic private key of B to obtain parameter sets G-A2 and L-A2, that is, the first key parameter, and sends the first key parameter to the participant A.

In S45, the participant A receives the parameter sets G-A2 and L-A2 sent by the participant B.

In S46, the participant B receives the parameter sets G-B2 and L-B2 sent by the participant A.

In S47, the participant A traverses the parameter set L-A2 and subtracts the random number R-A2 to obtain a parameter set L-A3.

In S48, the participant B traverses the parameter set L-B2 and subtracts the random number R-B2 to obtain a parameter set L-B3.

In S49, the participant A decodes values in the parameter set L-A3 to obtain L-A4, thereby obtaining real values (positive numbers are converted to positive numbers or negative numbers).

In S50, the participant B decodes values in the parameter set L-B3 to obtain L-B4, thereby obtaining real values (positive numbers are converted to positive numbers or negative numbers).

In S51, the participant A scales the parameters in the parameter set L-A4 according to the precision, returns the parameters to the original precision and converts integers to floating-point numbers to obtain a parameter set L-A5.

In S52, the participant B scales the parameters in the parameter set L-B4 according to the precision, returns the parameters to the original precision and converts integers to floating-point numbers to obtain a parameter set L-B5.

In S53, the participant A calculates the loss Loss-Current of the current submodel W-a through the parameter set L-A5.

In S54, the participant B calculates the loss Loss-Current of the current submodel W-b through the parameter set L-B5.

In S55, the participant A calculates the difference value between the current loss and the last loss, that is, the Loss-Current subtracts the Loss-Last, and determines whether the loss difference value is small enough to satisfy the convergence condition. If yes, the model training is ended. If not, the subsequent steps are continued.

In S56, the participant B calculates the difference value between the current loss and the last loss and determines whether the loss difference value is small enough to satisfy the convergence condition. If yes, the model training is ended. If not, the subsequent steps are continued.

In S57, if yes, the model training is ended, and the following steps are proceeded.

(a) At the end of model training, the participant A obtains the submodel W-A, and the participant B obtains the submodel W-B.

(b) The participant A encrypts the submodel W-A by using the public key sent by the trusted third party C and then sends the submodel W-A to the trusted third party C.

(c) The participant B encrypts the submodel W-B by using the public key sent by the trusted third party C and then sends the submodel W-B to the trusted third party C.

(d) The trusted third party C transmits the encrypted submodels W-A and W-B to the TEE, decrypts the encrypted sub-models W-A and W-B by using the private key in the TEE quarantine area and aggregates the models to obtain a complete model W.

(e) In TEE, the trusted third party C uses the mean and standard deviation of each feature and tag in the preceding steps, combines the mean and standard deviation with the complete model W and performs an inverse normalization operation to obtain a real model W-REAL.

(f) In TEE, the trusted third party C segments the model W-REAL into W-A-REAL and W-B-REAL.

(g) In TEE, the trusted third party C encrypts the model W-A-REAL by using the non-homomorphic public key transmitted from the participant A in the preceding steps and transmits the encrypted model W-A-REAL to the participant A.

(h) In TEE, the trusted third party C encrypts the model W-B-REAL by using the non-homomorphic public key transmitted from the participant B in the preceding steps and transmits the encrypted model W-B-REAL to the participant B.

(i) The participant A decrypts the encrypted model W-A-REAL by using a local private key to obtain W-A-REAL.

(j) The participant B decrypts the encrypted model W-B-REAL by using a local private key to obtain W-B-REAL.

In S58, if not, the model training is continued, and the subsequent steps are executed.

In S59, the participant A traverses the parameter set G-A2 and subtracts the random number R-A1 to obtain a parameter set G-A3.

In S60, the participant B traverses the parameter set G-B2 and subtracts the random number R-B1 to obtain a parameter set G-B3.

In S61, the participant A decodes values in the parameter set G-A3 to obtain G-A4, thereby obtaining real values (positive numbers are converted to positive numbers or negative numbers).

In S62, the participant B decodes values in the parameter set G-B3 to obtain G-B4, thereby obtaining real values (positive numbers are converted to positive numbers or negative numbers).

In S63, the participant A scales the parameters in the parameter set G-A4 according to the precision, returns the parameters to the original precision and converts integers to floating-point numbers to obtain a parameter set G-A5.

In S64, the participant B scales the parameters in the parameter set G-B4 according to the precision, returns the parameters to the original precision and converts integers to floating-point numbers to obtain a parameter set G-B5.

In S65, the participant A through the parameter set G-A5 calculates a gradient Grad-A for updating the local model.

In S66, the participant B through the parameter set G-B5 calculates a gradient Grad-B for updating the local model.

In S67, the participant A updates the submodel W-A by using the gradient Grad-A.

In S68, the participant B updates the submodel W-B by using the gradient Grad-B.

In S69, the participant A assigns the loss Loss-Current of the current submodel to Loss-Last.

In S70, the participant B assigns the loss Loss-Current of the current submodel to the Loss-Last.

In S71, the participant A repeatedly executes step S17.

In S72, the participant B repeatedly executes step S18.

In this embodiment, each participant can effectively protect the privacy data during the training process of the submodel, thereby improving the privacy and training efficiency of the training process of the model.

When the number of participants is greater, for example, a participant D is included, the method for this embodiment includes the steps below.

A first homomorphic encryption intermediate parameter and a second homomorphic encryption intermediate parameter are acquired. The first homomorphic encryption intermediate parameter is the data encrypted by using the second homomorphic public keys of the second participants B and D to encrypt a first training intermediate parameter. The first training intermediate parameter is an intermediate parameter generated by training a first submodel by the first participant based on first sample data. There are multiple second homomorphic encryption intermediate parameters. Each second homomorphic encryption intermediate parameter is data encrypted by using the second homomorphic public key of each second participant to encrypt each second training intermediate parameter. Each second training intermediate parameter is an intermediate parameter generated by training the second submodel by each second participant based on own second sample data. The machine learning model is composed of respective local submodels of at least two participants. That is, the participant B trains to obtain one second training intermediate parameter, and the participant D trains to obtain another second training intermediate parameter. Moreover, two second homomorphic encryption intermediate parameters are formed by encrypting the two second training intermediate parameters by the homomorphic encryption public keys of the participants B and D at the same time, respectively.

A first interference parameter is generated. Moreover, a first encryption interference parameter is formed by encrypting the first interference parameter by using the second homomorphic public keys of the second participants at the same time.

Calculation is performed based on the first homomorphic encryption intermediate parameter, the second homomorphic encryption intermediate parameter, the first encryption interference parameter and the homomorphic calculation function of the first submodel to generate a first encryption key parameter.

The first encryption key parameter is transmitted to each second participant for each second participant decrypts the first encryption key parameter by using the second homomorphic private key. The first encryption key parameter may be sequentially transmitted to each second participant for decryption.

A first key parameter obtained by the decrypting by the second participant is acquired.

The first submodel is iteratively updated according to the first key parameter and the first interference parameter until training of the first submodel is completed.

Figure 4:
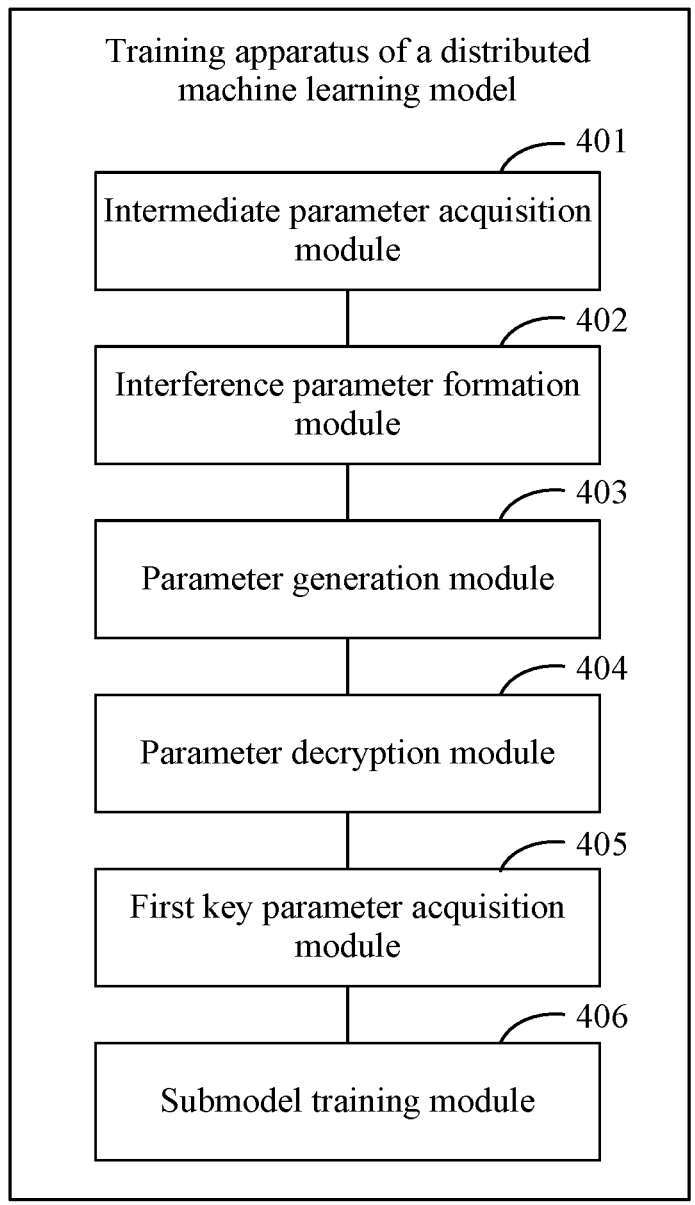
FIG. 4 is a schematic diagram of a training apparatus of a distributed machine learning model according to an embodiment of the present disclosure.

FIG. 4 is a schematic diagram of a training apparatus of a distributed machine learning model according to an embodiment of the present disclosure. This embodiment is applicable to the case where multiple parties perform data interaction under privacy protection requirements to complete training of the machine learning model. The apparatus is disposed in an electronic device and can implement the training method for a distributed machine learning model described in any embodiment of the present disclosure. Referring to FIG. 4, a training apparatus 400 of the distributed machine learning model specifically includes an intermediate parameter acquisition module 401, an interference parameter formation module 402, a parameter generation module 403, a parameter decryption module 404, a first key parameter acquisition module 405 and a submodel training module 406.

The intermediate parameter acquisition module 401 is configured to acquire a first homomorphic encryption intermediate parameter and a second homomorphic encryption intermediate parameter.

The interference parameter formation module 402 is configured to generate a first interference parameter and form a first encryption interference parameter by encrypting the first interference parameter by using the second homomorphic public key of a second participant.

The parameter generation module 403 is configured to perform calculation based on the first homomorphic encryption intermediate parameter, the second homomorphic encryption intermediate parameter, the first encryption interference parameter and the homomorphic calculation function of a first submodel to generate a first encryption key parameter.

The parameter decryption module 404 is configured to transmit the first encryption key parameter to the second participant for the second participant to decrypt the first encryption key parameter by using a second homomorphic private key.

The first key parameter acquisition module 405 is configured to acquire a first key parameter obtained by the decrypting the first encryption key parameter by the second participant.

The submodel training module 406 is configured to iteratively update the first submodel according to the first key parameter and the first interference parameter until training of the first submodel is completed.

In the embodiment of the present disclosure, the first homomorphic encryption intermediate parameter and the second homomorphic encryption intermediate parameter are acquired; the first interference parameter is generated and the first encryption interference parameter is formed by encrypting the first interference parameter by using the second homomorphic public key of the second participant; calculation is performed based on the first homomorphic encryption intermediate parameter, the second homomorphic encryption intermediate parameter, the first encryption interference parameter and the homomorphic calculation function of the first submodel to generate the first encryption key parameter; the first encryption key parameter is transmitted to the second participant, and so that the second participant decrypts the first encryption key parameter by using the second homomorphic private key. The first key parameter obtained by the decrypting by the second participant is acquired, and the first submodel is iteratively updated according to the first key parameter and the first interference parameter until the training of the first submodel is completed. The preceding solution implements the protection of the privacy data of the training model trained by multiple parties. At the same time, there is no need to use the trusted third party for coordination, avoiding the possibility of a malicious data breach by the trusted third party, avoiding a large volume of data interacting between the multiple parties and the trusted third party, and reducing the data transmission amount during the model training process, thereby improving the efficiency of model training.

In an optional embodiment, the first homomorphic encryption intermediate parameter is data obtained by encrypting a first training intermediate parameter by using the second homomorphic public key of the second participant, and the first training intermediate parameter is an intermediate parameter generated by training the first submodel by the first participant based on first sample data. The second homomorphic encryption intermediate parameter is data obtained by encrypting a second training intermediate parameter by using the second homomorphic public key of the second participant, and the second training intermediate parameter is an intermediate parameter generated by training the second submodel by the second participant based on second sample data. The machine learning model is composed of respective local submodels of at least two participants.

In an optional embodiment, the parameter generation module includes a parameter generating unit.

The parameter generation unit is configured to perform calculation based on the first homomorphic encryption intermediate parameter, the second homomorphic encryption intermediate parameter and the homomorphic calculation function of the first submodel and superpose the first encryption interference parameter to the calculation result based on linear calculation to generate the first encryption key parameter.

Correspondingly, the submodel training module includes a submodel training unit.

The submodel training unit is configured to perform inverse linear calculation on the first key parameter based on the first interference parameter and iteratively update the first submodel according to the key parameter obtained by the inverse linear calculation until the training of the first submodel is completed.

In an optional embodiment, the interference parameters are random numbers.

In an optional embodiment, the first interference parameter includes a first gradient interference parameter and a first loss interference parameter.

Correspondingly, the parameter generation module includes a gradient parameter generation module and a loss parameter generation module.

The gradient parameter generation module is configured to perform calculation based on the first homomorphic encryption intermediate parameter, the second homomorphic encryption intermediate parameter, a first encryption gradient interference parameter and the homomorphic gradient calculation function of the first submodel to generate a first encryption gradient parameter.

The loss parameter generation module is configured to perform calculation based on the first homomorphic encryption intermediate parameter, the second homomorphic encryption intermediate parameter, the first encryption loss interference parameter and the homomorphic loss calculation function of the first submodel to generate a first encryption loss parameter.

In an optional embodiment, the apparatus further includes a first homomorphic keypair generation module, a first homomorphic public key sending module and a second homomorphic public key receiving module.

The first homomorphic keypair generation module is configured to generate a first homomorphic keypair. The first homomorphic keypair includes a first homomorphic public key and a first homomorphic private key.

The first homomorphic public key sending module is configured to send the first homomorphic public key to the second participant.

The second homomorphic public key receiving module is configured to receive the second homomorphic public key in a second homomorphic keypair generated and sent by the second participant.

In an optional embodiment, the apparatus further includes an intersection identifier determining module.

The intersection identifier determination module is configured to, before the first homomorphic encryption intermediate parameter and the second homomorphic encryption intermediate parameter are acquired, determine the intersection identifier of the sample data of the first participant and the sample data of the second participant. The sample data of at least one participant is marked by a tag.

In an optional embodiment, the apparatus further includes a sample data processing module and a first normalized value encryption module.

The sample data processing module is configured to, before the first homomorphic encryption intermediate parameter and the second homomorphic encryption intermediate parameter are acquired, normalize the first original sample data of the first participant to obtain a first normalized value of the sample feature dimension and the first sample data. The first sample data obtained by normalizing the first original sample data is configured for model training.

The first normalized value encryption module is configured to form a first encrypted normalized value by encrypting the first normalized value by using a third encryption key and provide the first encrypted normalized value for a trusted third party.

Correspondingly, the apparatus further includes a model segmentation module and a submodel receiving module.

The model segmentation module is configured to, after the training of the first submodel is completed, form a first encrypted submodel by encrypting the first submodel by using the third encryption key, provide the first encrypted submodel for the trusted third party so that the trusted third party combines the first encrypted submodel with encrypted submodels provided by the plurality of participants, perform denormalization based on encrypted normalized values provided by the participants and then perform segmentation on denormalized submodels.

The submodel receiving module is configured to receive the segmented first denormalized submodel returned by the trusted third party.

In an optional embodiment, the intermediate parameter acquisition module includes a first training intermediate parameter generation unit, a first large integer determination unit, a first positive integer determination unit and a first homomorphic encryption intermediate parameter determination unit.

The first training intermediate parameter generation unit is configured to generate a first training intermediate parameter by training the first submodel based on the first sample data.

The first large integer determination unit is configured to convert the floating-point number in the first training intermediate parameter to a first large integer according to the set precision.

The first positive integer determination unit is configured to encode the integer value in the first large integer and convert the first large integer to a first positive integer.

The first homomorphic encryption intermediate parameter determination unit is configured to obtain the first homomorphic encryption intermediate parameter by encrypting the first positive integer by using the second homomorphic public key of the second participant.

In an optional embodiment, the submodel training module includes a de-interference operation unit, a floating-point number conversion unit and an iterative update unit.

The de-interference operation unit is configured to perform a de-interference operation on the first key parameter based on the first interference parameter.

The floating-point number conversion unit is configured to decode the first key parameter having undergone the de-interference operation and scale the first key parameter according to the set precision to convert the first key parameter to a floating-point number.

The iterative update unit is configured to iteratively update the first submodel by using the converted first key parameter in a form of the floating-point number.

A training apparatus of a distributed machine learning model provided by the technical solution of the embodiment of the present disclosure can execute the training method for a distributed machine learning model provided by any embodiment of the present disclosure and has corresponding functional modules and beneficial effects for executing the training method for a distributed machine learning model.

In the technical solutions in the present disclosure, acquisition, storage and application of user personal information involved are in compliance with relevant laws and regulations and do not violate the public order and good customs.

According to embodiments of the present disclosure, the present disclosure further provides an electronic device, a readable storage medium and a computer program product.

Figure 5:
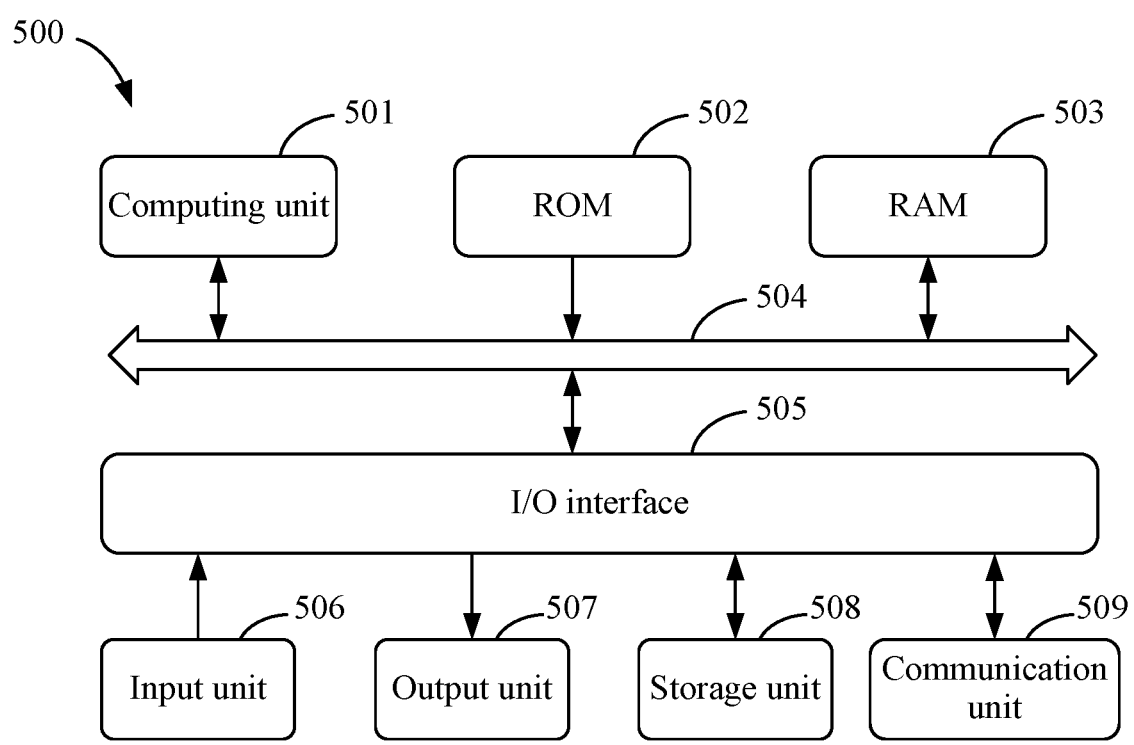
FIG. 5 is a block diagram of an electronic device for implementing a training method for a distributed machine learning model according to an embodiment of the present disclosure.

FIG. 5 is a block diagram of an exemplary electronic device 500 that may be configured to implement the embodiments of the present disclosure. The electronic device is intended to represent various forms of digital computers, for example, a laptop computer, a desktop computer, a worktable, a personal digital assistant, a server, a blade server, a mainframe computer or another applicable computer. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may execute various types of appropriate operations and processing based on a computer program stored in a read-only memory (ROM) 502 or a computer program loaded from a storage unit 508 to a random-access memory (RAM) 503. Various programs and data required for operations of the device 500 may also be stored in the RAM 503. The computing unit 501, the ROM 502 and the RAM 503 are connected to each other through a bus 504. An input/output (I/O) interface 505 is also connected to the bus 504.

Multiple components in the device 500 are connected to the I/O interface 505. The components include an input unit 506 such as a keyboard and a mouse, an output unit 507 such as various types of displays and speakers, the storage unit 508 such as a magnetic disk and an optical disc, and a communication unit 509 such as a network card, a modem and a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Examples of the computing unit 501 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. The computing unit 501 executes various methods and processing described above, such as the training method for a distributed machine learning model. For example, in some embodiments, the training method for a distributed machine learning model may be implemented as a computer software program tangibly contained in a machine-readable medium such as the storage unit 508. In some embodiments, part or all of computer programs may be loaded and/or installed on the equipment 500 via the ROM 502 and/or the communication unit 509. When the computer programs are loaded into the RAM 503 and executed by the computing unit 501, one or more steps of the preceding training method for a distributed machine learning model may be performed. Alternatively, in other embodiments, the computing unit 501 may be configured, in any other suitable manner (for example, by using firmware), to execute the training method for a distributed machine learning model.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting the data and instructions to the memory system, the at least one input apparatus and the at least one output apparatus.

Program codes for the implementation of the method for the present disclosure may be written in any combination of one or more programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

A computing system may include a client and a server. The client and the server are usually far away from each other and generally interact through the communication network. The relationship between the clients and the servers arises by virtue of computer programs running on respective computers and having a client-server relationship to each other.

It is to be understood that various forms of the preceding flows may be used with steps reordered, added, or removed. For example, the steps described in the present disclosure may be executed in parallel, in sequence or in a different order as long as the desired result of the technical solutions disclosed in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution or improvement made within the spirit and principle of the present disclosure falls within the scope of the present disclosure.

What is claimed is:

1. A training method for a distributed machine learning model, the method being executed by one participant of a plurality of participants participating in training of the model; the one participant being denoted as a first participant; among the plurality of participants, a participant other than the one participant being denoted as a second participant; and wherein the method comprises:
    acquiring a first homomorphic encryption intermediate parameter and a second homomorphic encryption intermediate parameter;
    generating a first interference parameter, and forming a first encryption interference parameter by encrypting the first interference parameter by using a second homomorphic public key of the second participant;
    performing calculation based on the first homomorphic encryption intermediate parameter, the second homomorphic encryption intermediate parameter, the first encryption interference parameter and a homomorphic calculation function of a first submodel to generate a first encryption key parameter;
    transmitting the first encryption key parameter to the second participant, and decrypting, by the second participant, the first encryption key parameter by using a second homomorphic private key;

acquiring a first key parameter obtained by the decrypting the first encryption key parameter by the second participant; and iteratively updating the first submodel according to the first key parameter and the first interference parameter until training of the first submodel is completed;

wherein the first homomorphic encryption intermediate parameter is data obtained by encrypting a first training intermediate parameter by using the second homomorphic public key of the second participant, and the first training intermediate parameter is an intermediate parameter obtained by training the first submodel by the first participant based on first sample data;

the second homomorphic encryption intermediate parameter is data obtained by encrypting a second training intermediate parameter by using the second homomorphic public key of the second participant, and the second training intermediate parameter is an intermediate parameter obtained by training the second submodel by the second participant based on second sample data; and the machine learning model comprises respective local submodels of at least two of the plurality of participants;

before the acquiring the first homomorphic encryption intermediate parameter and the second homomorphic encryption intermediate parameter, the method further comprising:

normalizing first original sample data of the first participant to obtain a first normalized value of a sample feature dimension and the first sample data, wherein the first sample data obtained by normalizing the first original sample data is configured for model training; and forming a first encrypted normalized value by encrypting the first normalized value by using a third encryption key, and providing the first encrypted normalized value for a trusted third party; and wherein after the training of the first submodel is completed, the method further comprises:

forming a first encrypted submodel by encrypting the first submodel by using the third encryption key, providing the first encrypted submodel for the trusted third party, so that the trusted third party combines the first encrypted submodel with encrypted submodels provided by the plurality of participants, performing denormalization on combined encrypted submodels based on encrypted normalized values provided by the plurality of participants, and then performing segmentation on denormalized submodels; and receiving a first denormalized submodel returned by the trusted third party after the denormalized submodels are segmented.

2. The method according to claim 1, wherein the performing calculation based on the first homomorphic encryption intermediate parameter, the second homomorphic encryption intermediate parameter, the first encryption interference parameter and the homomorphic calculation function of the first submodel to generate the first encryption key parameter comprises:

performing calculation based on the first homomorphic encryption intermediate parameter, the second homomorphic encryption intermediate parameter and the homomorphic calculation function of the first submodel, and superimposing the first encryption interference parameter on a calculation result based on linear calculation to generate the first encryption key parameter; and wherein the iteratively updating the first submodel according to the first key parameter and the first interference parameter until the training of the first submodel is completed comprises:

performing inverse linear calculation on the first key parameter based on the first interference parameter, and iteratively updating the first submodel according to a key parameter obtained by the inverse linear calculation until the training of the first submodel is completed.

3. The method according to claim 1, wherein the interference parameter is a random number.

4. The method according to claim 1, wherein the first interference parameter comprises a first gradient interference parameter and a first loss interference parameter; and wherein the performing calculation based on the first homomorphic encryption intermediate parameter, the second homomorphic encryption intermediate parameter, the first encryption interference parameter and the homomorphic calculation function of the first submodel to generate the first encryption key parameter comprises:

performing calculation based on the first homomorphic encryption intermediate parameter, performing calculation based on the first homomorphic encryption intermediate parameter, the second homomorphic encryption intermediate parameter, a first encryption gradient interference parameter and a homomorphic gradient calculation function of the first submodel to generate a first encryption gradient parameter; and performing calculation based on the first homomorphic encryption intermediate parameter, performing calculation based on the first homomorphic encryption intermediate parameter, the second homomorphic encryption intermediate parameter, a first encryption loss interference parameter and a homomorphic loss calculation function of the first submodel to generate a first encryption loss parameter.

5. The method according to claim 1, further comprising:

generating a first homomorphic keypair, wherein the first homomorphic keypair comprises a first homomorphic public key and a first homomorphic private key;

sending the first homomorphic public key to the second participant; and receiving the second homomorphic public key of a second homomorphic keypair generated and sent by the second participant.

6. The method according to claim 1, before the acquiring the first homomorphic encryption intermediate parameter and the second homomorphic encryption intermediate parameter, the method further comprising:

determining an intersection identifier of sample data of the first participant and sample data of the second participant, wherein the sample data of at least one participant of the first participant and the second participant is marked by a tag.

7. The method according to claim 1, wherein the acquiring the first homomorphic encryption intermediate parameter comprises:

generating the first training intermediate parameter by training the first submodel based on the first sample data;

converting a floating-point number in the first training intermediate parameter to a first large integer according to a set precision;

encoding an integer value in the first large integer to convert the first large integer to a first positive integer; and obtaining the first homomorphic encryption intermediate parameter by encrypting the first positive integer by using the second homomorphic public key of the second participant.

8. The method according to claim 7, wherein the iteratively updating the first submodel according to the first key parameter and the first interference parameter comprises:

performing a de-interference operation on the first key parameter based on the first interference parameter;

decoding the first key parameter having undergone the de-interference operation, and scaling the first key parameter according to the set precision to convert the first key parameter to a floating-point number; and iteratively updating the first submodel by using the converted first key parameter in a form of the floating-point number.

9. A non-transitory computer-readable storage medium storing computer instructions for causing a computer to execute a training method for a distributed machine learning model, wherein the method is executed by one participant of a plurality of participants participating in training of the model; the one participant is denoted as a first participant; among the plurality of participants, a participant other than the one participant is denoted as a second participant; and wherein the method comprises:

acquiring a first homomorphic encryption intermediate parameter and a second homomorphic encryption intermediate parameter;

generating a first interference parameter, and forming a first encryption interference parameter by encrypting the first interference parameter by using a second homomorphic public key of the second participant;

performing calculation based on the first homomorphic encryption intermediate parameter, the second homomorphic encryption intermediate parameter, the first encryption interference parameter and a homomorphic calculation function of a first submodel to generate a first encryption key parameter;

transmitting the first encryption key parameter to the second participant, and decrypting, by the second participant, the first encryption key parameter by using a second homomorphic private key;

acquiring a first key parameter obtained by the decrypting the first encryption key parameter by the second participant; and iteratively updating the first submodel according to the first key parameter and the first interference parameter until training of the first submodel is completed;

wherein the first homomorphic encryption intermediate parameter is data obtained by encrypting a first training intermediate parameter by using the second homomorphic public key of the second participant, and the first training intermediate parameter is an intermediate parameter obtained by training the first submodel by the first participant based on first sample data;

the second homomorphic encryption intermediate parameter is data obtained by encrypting a second training intermediate parameter by using the second homomorphic public key of the second participant, and the second training intermediate parameter is an intermediate parameter obtained by training the second submodel by the second participant based on second sample data; and the machine learning model comprises respective local submodels of at least two of the plurality of participants;

before the acquiring the first homomorphic encryption intermediate parameter and the second homomorphic encryption intermediate parameter, the method further comprising:

normalizing first original sample data of the first participant to obtain a first normalized value of a sample feature dimension and the first sample data, wherein the first sample data obtained by normalizing the first original sample data is configured for model training; and forming a first encrypted normalized value by encrypting the first normalized value by using a third encryption key, and providing the first encrypted normalized value for a trusted third party; and wherein after the training of the first submodel is completed, the method further comprises:

forming a first encrypted submodel by encrypting the first submodel by using the third encryption key, providing the first encrypted submodel for the trusted third party, so that the trusted third party combines the first encrypted submodel with encrypted submodels provided by the plurality of participants, performing denormalization on combined encrypted submodels based on encrypted normalized values provided by the plurality of participants, and then performing segmentation on denormalized submodels; and receiving a first denormalized submodel returned by the trusted third party after the denormalized submodels are segmented.

10. A training apparatus of a distributed machine learning model, comprising at least one processor and a memory, wherein the memory stores processor-executable programs, and the programs comprise:

an intermediate parameter acquisition module configured to acquire a first homomorphic encryption intermediate parameter and a second homomorphic encryption intermediate parameter;

an interference parameter formation module configured to generate a first interference parameter and form a first encryption interference parameter by encrypting the first interference parameter by using a second homomorphic public key of a second participant;

a parameter generation module configured to perform calculation based on the first homomorphic encryption intermediate parameter, the second homomorphic encryption intermediate parameter, the first encryption interference parameter and a homomorphic calculation function of a first submodel to generate a first encryption key parameter;

a parameter decryption module configured to transmit the first encryption key parameter to the second participant for the second participant to decrypt the first encryption key parameter by using a second homomorphic private key;

a first key parameter acquisition module configured to acquire a first key parameter obtained by the decrypting the first encryption key parameter by the second participant; and a submodel training module configured to iteratively update the first submodel according to the first key parameter and the first interference parameter until training of the first submodel is completed;

wherein the first homomorphic encryption intermediate parameter is data obtained by encrypting a first training intermediate parameter by using the second homomorphic public key of the second participant, and the first training intermediate parameter is an intermediate parameter obtained by training the first submodel by the first participant based on first sample data;

the second homomorphic encryption intermediate parameter is data obtained by encrypting a second training intermediate parameter by using the second homomorphic public key of the second participant, and the second training intermediate parameter is an intermediate parameter obtained by training the second submodel by the second participant based on second sample data; and the machine learning model comprises respective local submodels of at least two participants;

wherein the apparatus further comprises: a sample data processing module configured to, before acquiring the first homomorphic encryption intermediate parameter and the second homomorphic encryption intermediate parameter, normalize first original sample data of the first participant to obtain a first normalized value of a sample feature dimension and the first sample data, wherein the first sample data obtained by the normalizing the first original sample data is configured for model training; and a first normalized value encryption module configured to form a first encrypted normalized value by encrypting the first normalized value by using a third encryption key, and provide the first encrypted normalized value for a trusted third party; and wherein the apparatus further comprising:

a model segmentation module configured to, after the training of the first submodel is completed, form a first encrypted submodel by encrypting the first submodel by using the third encryption key, provide the first encrypted submodel for the trusted third party so that the trusted third party combines the first encrypted submodel with encrypted submodels provided by the plurality of participants, perform denormalization based on encrypted normalized values provided by the at least two participants, and then perform segmentation on denormalized submodels; and a submodel receiving module configured to receive a first denormalized submodel returned by the trusted third party after the denormalized submodels are segmented.

11. The apparatus according to claim 10, wherein the parameter generation module comprises:

a parameter generation unit configured to perform calculation based on the first homomorphic encryption intermediate parameter, the second homomorphic encryption intermediate parameter and the homomorphic calculation function of the first submodel, and superimpose the first encryption interference parameter on a calculation result based on linear calculation to generate the first encryption key parameter; and the submodel training module comprises:

a submodel training unit configured to perform inverse linear calculation on the first key parameter based on the first interference parameter, and iteratively update the first submodel according to a key parameter obtained by the inverse linear calculation until the training of the first submodel is completed.

12. The apparatus according to claim 10, wherein the interference parameter is a random number.

13. The apparatus according to claim 10, wherein the first interference parameter comprises a first gradient interference parameter and a first loss interference parameter; and wherein the parameter generation module comprises:

a gradient parameter generation module configured to perform calculation based on the first homomorphic encryption intermediate parameter, the second homomorphic encryption intermediate parameter, a first encryption gradient interference parameter and a homomorphic gradient calculation function of the first submodel to generate a first encryption gradient parameter; and a loss parameter generation module configured to perform calculation based on the first homomorphic encryption intermediate parameter, the second homomorphic encryption intermediate parameter, the first encryption loss interference parameter and a homomorphic loss calculation function of the first submodel to generate a first encryption loss parameter.

14. The apparatus according to claim 10, further comprising:

a first homomorphic keypair generation module configured to generate a first homomorphic keypair, wherein the first homomorphic keypair comprises a first homomorphic public key and a first homomorphic private key;

a first homomorphic public key sending module configured to send the first homomorphic public key to the second participant; and a second homomorphic public key receiving module configured to receive a second homomorphic public key of a second homomorphic keypair generated and sent by the second participant.

15. The apparatus according to claim 10, further comprising:

an intersection identifier determination module configured to, before acquiring the first homomorphic encryption intermediate parameter and the second homomorphic encryption intermediate parameter, determine an intersection identifier of sample data of the first participant and sample data of the second participant, wherein the sample data of at least one participant of the first participant and the second participant is marked by a tag.

16. The apparatus according to claim 10, wherein the intermediate parameter acquisition module comprises:

a first training intermediate parameter generation unit configured to generate the first training intermediate parameter by training the first submodel based on the first sample data;

a first large integer determination unit configured to convert a floating-point number in the first training intermediate parameter to a first large integer according to a set precision;

a first positive integer determination unit configured to encode an integer value in the first large integer to convert the first large integer to a first positive integer; and a first homomorphic encryption intermediate parameter determination unit configured to obtain the first homomorphic encryption intermediate parameter by encrypting the first positive integer by using the second homomorphic public key of the second participant.

17. The apparatus according to claim 16, wherein the submodel training module comprises:

a de-interference operation unit configured to perform a de-interference operation on the first key parameter based on the first interference parameter;

a floating-point number conversion unit configured to decode the first key parameter having undergone the de-interference operation, and scale the first key parameter according to the set precision to convert the first key parameter to a floating-point number; and an iterative update unit configured to iteratively update the first submodel by using the converted first key parameter in a form of the floating-point number.

\* \* \* \* \*